United States Patent Office.

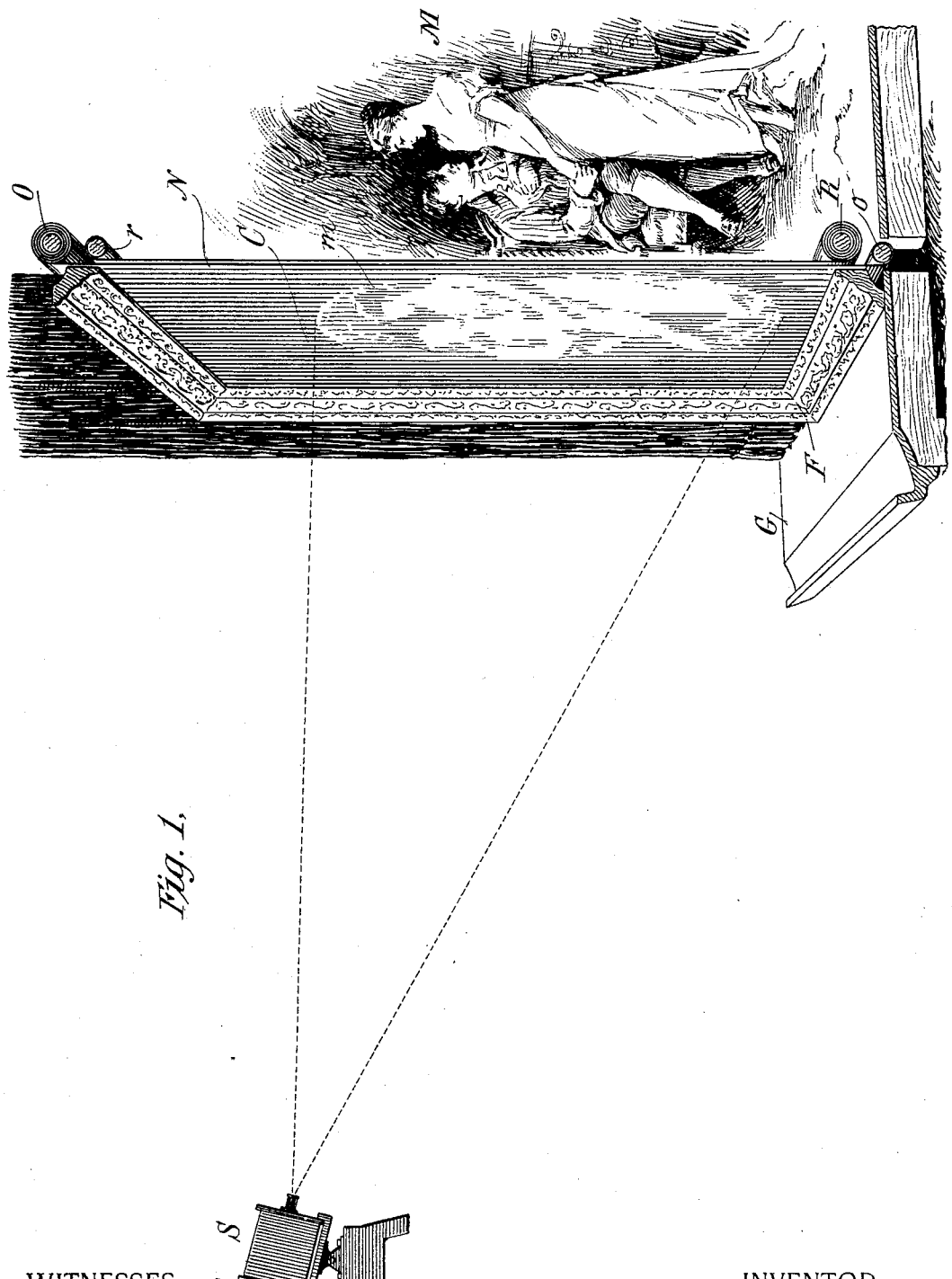

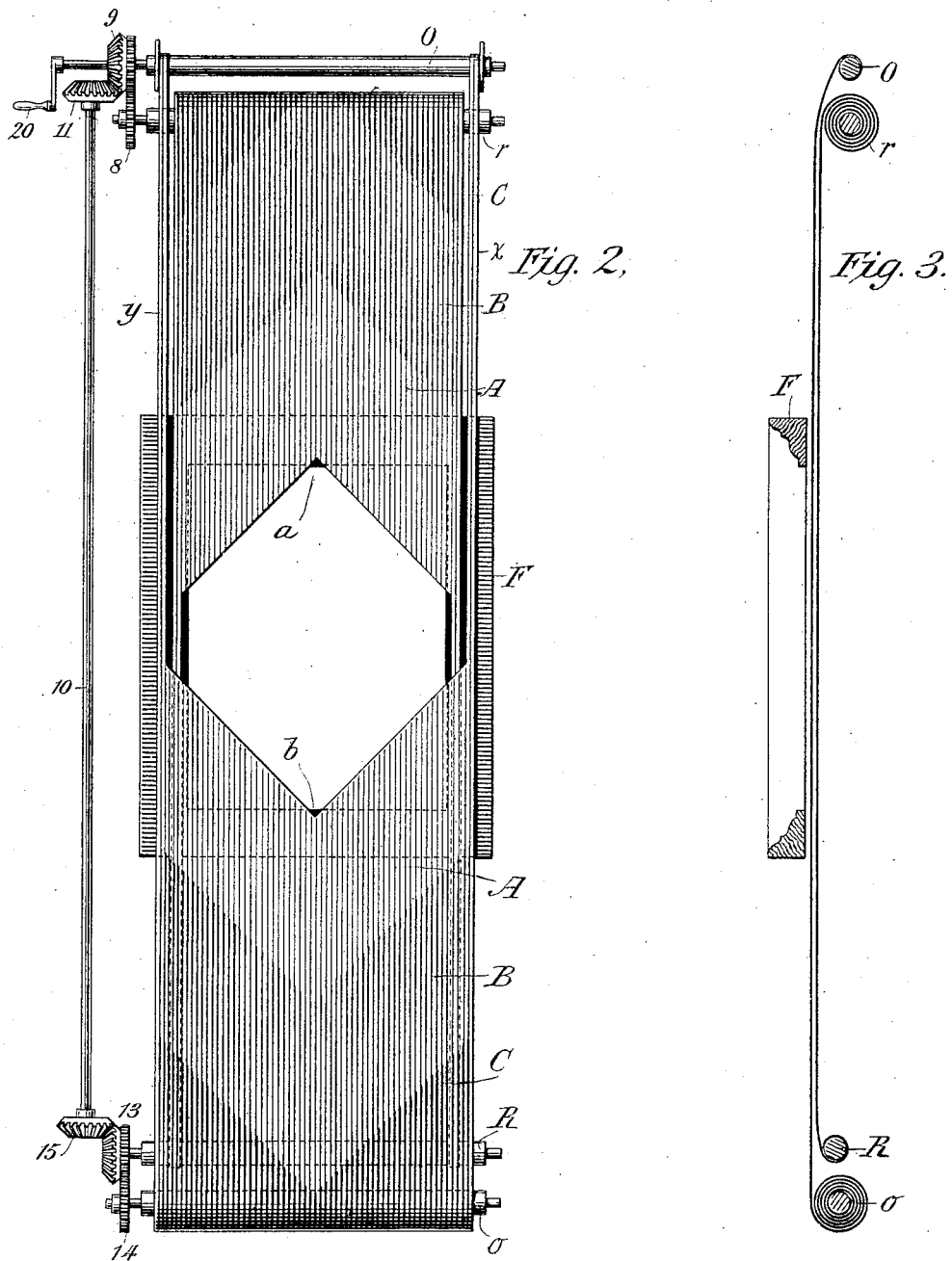

MARION H. KERNER, OF NEW YORK, N. Y.

APPARATUS FOR PRODUCING TABLEAUX VIVANTS.

SPECIFICATION forming part of Letters Patent No. 570,255, dated October 27, 1896.

Application filed January 10, 1896. Serial No. 574,947. (No model.)

*To all whom it may concern:*

Be it known that I, MARION H. KERNER, a citizen of the United States, residing in the city of New York, county and State of New York, have made certain new and useful Improvements in the Art of and Apparatus for Producing Tableaux Vivants, of which the following is a specification.

The object of my improvement is to intensify and prolong the visible effect produced by exposing an object or model located upon a stage before an assemblage of spectators, and to maintain the attention of the spectators continuously and uninterruptedly during the exhibition of a series of respectively different visible effects.

My invention embodies the use or employment of an opaque, dissolving, or disappearing medium, such as a series of gauze curtains arranged in a manner to be described. Behind this normally opaque screen or curtain I place a suitably-arranged model or object, which may be a human figure suitably draped. This model is or may be obscured from the view of the spectators by the normally opaque medium. Before this medium, or upon the opposite side thereof from the model, where the spectators are grouped or located, I place a picture or slide-photograph of the object or model, and I provide for use in connection therewith means to concentrate artificial light—such, for instance, as a stereopticon or magic lantern. I project this picture of the model upon the opaque medium and I then gradually remove, separate, or eliminate the described opaque screen or curtain, thus bringing into direct view the object or model, located upon the stage and normally obscured by the opaque body. The impression, picture, or outline produced by the stereopticon is substantially coextensive and coincident with the impression or outline produced by direct and unobstructed view of the model, and by gradually rendering the opaque body or medium transparent and ultimately removing it and also the projected picture I am enabled to substitute a direct view of the model for a view of the stereoscopic picture projected upon the opaque medium, and this change I produce gradually and in such a manner that the senses are unable to perceive its accomplishment. When the model or object has been in view for the time limit, I bring the opaque body into position so gradually as to produce a dissolving effect, and when the screen or curtain has become sufficiently opaque the stereopticon-picture is gradually and completely again substituted for the direct view of the model. After a suitably-extended exposure the stereopticon-picture is caused to dissolve, a cloudy, hazy, or nebulous effect from the stereopticon replaces it, and then a new picture is substituted, imperceptibly replaced by the model, this in turn being imperceptibly replaced by the picture, and so on uninterruptedly and continuously to the end of the exhibition.

The apparatus I employ consists of a stage with a suitable exhibition space or frame, a series of gauze curtains, which may be of successively different colors, for instance, the first white, the second blue, the third darker or black, and so on. These curtains are preferably arranged in two sections, approaching each other, one by raising, the other by lowering, and their advance or meeting edges are curved or angular to reproduce the effect of the well-known "cat's eye dissolver" employed in stereopticons. Upon one side of the curtains I place a car or stand for the model and upon the other side at some distance I place a stereopticon or magic lantern having a photographic or other picture of the model referred to.

The stereopticon may be any suitable arrangement of artificial light and glasses and the curtains may be caused to overlap and to approach each other from the sides, or there may be a series of gauze curtains in parallel planes with suitable means for moving them into and out of position.

The accompanying drawings illustrate my invention so far as it is susceptible of diagrammatic representation.

Figure 1 is a complete view of my invention. Fig. 2 is a front view of the opaque medium with means for adjusting the degree of opacity, and Fig. 3 is a vertical section of Fig. 2.

M is a model or "living picture," as it is technically called, located on the stage G before the assembled spectators.

S is a stereopticon preferably located at the rear of the audience-chamber, as in one of the galleries. This stereopticon is a well-known device consisting of a refracting-glass in a box or inclosure and an artificial light for concentration upon a distant point. Within the stereopticon is a lantern-slide having a picture, preferably produced by some photographic process, of the model M.

Between the model and the picture there is an opaque medium N, capable of adjustment with regard to its degree of opacity, that is, it may be rendered opaque, then semitransparent, then completely transparent or entirely removed. Its construction is shown in Fig. 2. There are four rollers arranged in two pairs, O and o, R and r. Two pairs of belts, as x and y, pass over each pair of rollers, respectively, and a composite curtain of gauze is fixed upon each pair of belts. One is furled upon one roller, as o, at the bottom, to be rolled upon its companion O at the top. Another similar curtain fixed upon belts is furled upon the roller r at the top and may be rolled over the roller R at the bottom. Each curtain is composed of sections of substantially the same material, that is, gauze, the first, A, may be white, the second, B, a smoky blue, the third, C, darker, or even black, and the meshes of the successive curtain-sections may increase in fineness, that is, the number of threads to the inch may increase to render the gauze more opaque. The advance or meeting edges of the two curtains and of each section of each curtain is suitably notched, curved, or varied to produce any desired form or outline. In the drawings I have shown the two curtains having right-angled notches, as at a and b, the object being to have the opening gradually contract as the curtains move toward each other until the opening disappears. When the opening has entirely disappeared, there is a section of gauze A between the spectator and the object. As the curtains advance a double thickness intervenes, followed by a double thickness of darker or more opaque color, and this is followed by another still more opaque, entirely obscuring direct view of the object or model. As shown in Fig. 1, the described third section C intervenes, obscuring the model and forming a dark screen or curtain for the picture of the model M, projected from the stereopticon S. The curtains are caused to move in fixed relation by having their various sections united into a continuous sheet and by gearing the four rollers together through the medium of the wheels 8 and 9, 13 and 14, the vertical rod 10, having the beveled wheels 11 and 15, operated by the crank 20.

It is well known that it is practically impossible for a living object to remain immovable for more than a few minutes, and that this affords a limited and transitory view, and that the time consumed in substituting one direct view for another is extensive in proportion to the time limit of exposure. The operation according to my improvement in the art or process completely obviates this difficulty, because I am enabled to greatly extend the time of apparent exposure. In practicing my improvement the projected picture may first appear and may be dissipated by manipulating the light and increasing the transparency of the opaque medium to cause the direct view of the model to be substituted for it, and the view of the model may be substituted by the projected picture or not, according to the extent of time desired to be occupied by any given subject, or the model may first be exposed to direct view, to be followed by the projected picture, the change being made gradually and imperceptibly, and by the use of a projected cloud effect the model may be brought into view by manipulating the light and the intervening opaque medium.

The use of the term "opaque dissolving or disappearing medium" is understood to be the converse of a transparent medium, arranged to be gradually rendered less transparent, semitransparent, and so on until it becomes opaque to the extent of forming an effective screen or curtain for a projection of the stereopticon-picture, and its use may be accompanied by the employment of side lights or artificial lights of sufficient strength to subordinate the projected picture.

I may also employ a picture or lantern-slide of such a character that a cloudy, hazy, or nebulous effect is projected upon the opaque medium, and by adjusting said medium to make it more transparent I may cause the model to appear to direct vision as if breaking through or embedded in a cloud.

What I claim, and desire to secure by Letters Patent, is—

1. An adjustable gauze curtain for intercepting direct vision in theatrical or stage effects, said curtain consisting of two or more sections of gauze fabric united into a continuous sheet, of respectively different colors calculated to vary the opacity thereof, and means for moving the curtain gradually and practically imperceptibly, substantially as described.

2. The combination of two sectional sheets of gauze located upon rollers in parallel planes at opposite sides of a frame or opening, corresponding sections of each curtain being of similar color and successive sections of both curtains being of a color effective to increase the opacity thereof, substantially as described.

3. The combination of two curtains located upon rollers and moving in parallel planes approaching from opposite sides of a frame or opening, the meeting edges of both curtains being notched or cut to form complementary parts of a gradually-contracting characteristic outline, serving to graduate a dissolving effect, substantially as described.

MARION H. KERNER.

Witnesses:
W. S. PLACE,
W. B. VANSIZE.